United States Patent
Hussain et al.

(10) Patent No.: US 8,931,284 B2
(45) Date of Patent: Jan. 13, 2015

(54) FLOW DISCHARGE DEVICE

(75) Inventors: Zahid M Hussain, Derby (GB); Jonathan G Bird, Derby (GB)

(73) Assignee: Rolls-Royce PLC, London (GB)

( * ) Notice: Subject to any disclaimer, the term of this patent is extended or adjusted under 35 U.S.C. 154(b) by 838 days.

(21) Appl. No.: 12/704,711

(22) Filed: Feb. 12, 2010

(65) Prior Publication Data
US 2010/0236256 A1 Sep. 23, 2010

(30) Foreign Application Priority Data
Mar. 17, 2009 (GB) .................................. 0904555.0

(51) Int. Cl.
F02C 6/04 (2006.01)
F02C 9/18 (2006.01)
F02C 6/08 (2006.01)
F02K 3/06 (2006.01)

(52) U.S. Cl.
CPC ... F02C 6/08 (2013.01); F02C 9/18 (2013.01); F02K 3/06 (2013.01)
USPC .................. 60/785; 60/782; 60/795; 415/115; 416/92; 416/96 R; 416/97 R

(58) Field of Classification Search
USPC .............. 60/782, 785, 795; 415/115, 144, 92, 415/96 R, 97 R
See application file for complete search history.

(56) References Cited

U.S. PATENT DOCUMENTS

| | | | |
|---|---|---|---|
| 5,117,626 A * | 6/1992 | North et al. ..................... | 60/806 |
| 5,704,207 A | 1/1998 | Jensen et al. | |
| 6,190,129 B1 * | 2/2001 | Mayer et al. ................. | 416/97 R |
| 6,565,313 B2 * | 5/2003 | Nikkanen et al. .............. | 415/144 |
| 6,588,195 B2 * | 7/2003 | Negulescu ....................... | 60/785 |
| 7,413,403 B2 * | 8/2008 | Cunha et al. ...................... | 416/1 |
| 7,704,045 B1 * | 4/2010 | Liang .............................. | 416/92 |
| 2001/0042368 A1 | 11/2001 | Negulescu | |
| 2008/0053105 A1 * | 3/2008 | Appleby et al. ................. | 60/785 |
| 2008/0118366 A1 * | 5/2008 | Correia et al. .............. | 416/97 R |
| 2008/0166220 A1 * | 7/2008 | Chen et al. .................... | 415/115 |
| 2009/0032615 A1 * | 2/2009 | Bertolotti et al. ......... | 239/265.17 |

FOREIGN PATENT DOCUMENTS

EP 1 854 989 A2 11/2007
GB 2 132 269 A 7/1984

OTHER PUBLICATIONS

Jul. 8, 2009 Search Report issued in British Patent Application No. 0904555.0.

* cited by examiner

Primary Examiner — Craig Kim
(74) Attorney, Agent, or Firm — Oliff PLC

(57) ABSTRACT

A flow discharge device, such as a compressor bleed outlet discharging into a bypass duct of a gas turbine engine, comprises an outlet panel 46 which is perforated by openings 48, 50 disposed in an array which tapers in the downstream direction with respect to the flow B in the bypass duct. The configuration of the array of openings 48, 50 creates a plume 60 of tapering form, which enables the bypass flow B to come together downstream of the plume 60 with minimal wake generation, to provide a shield of cooler air so as to avoid contact between the hot gas plume 60 and a wall of 27 of the bypass duct 22. The resulting aerofoil-shaped cross section of the plume 60 also reduces any blocking effect in the bypass duct 22, with consequent performance benefits for the engine fan.

14 Claims, 3 Drawing Sheets

FLOW DISCHARGE DEVICE

This invention relates to a flow discharge device in a duct, and is particularly, although not exclusively, concerned with such a device for discharging compressor bleed air into a bypass duct of a gas turbine engine.

When a gas turbine engine is operating under transient conditions, for example when decelerating, it may be necessary to bleed air at high pressure from the core gas flow through the engine. Such air may be discharged through a discharge device into a bypass flow within the engine. Bleed valves are provided to control the discharge of air. The flow of bleed air from the core gas flow into the bypass flow takes place over a substantial pressure drop, and can generate significant noise. It is therefore usual for the discharge device to be configured so as to reduce the noise. A typical measure is to discharge the bleed air into the bypass duct through a perforated plate, sometimes referred to as a "pepper pot" as disclosed, for example, in US2001/0042368. The pepper pot serves to break the single body of air flowing towards the bypass duct into a large number of smaller jets which promote small-scale turbulence and hence quicker mixing with the main flow through the bypass duct.

Pepper pots in known gas turbine engines often have a circular shape, although oblong or "race track" shapes are also known. The holes in the pepper pot may be oriented to discharge the air flowing through them in a desired direction, in order to enhance mixing of the hot bleed air with the cooler main flow through the bypass duct, generated by the fan. Such rapid mixing is desirable to avoid impingement of the hot bleed flow on the bypass duct surfaces.

The individual flow jets from the pepper pot holes tend to coalesce into a single plume, and consequently the bleed flow does not mix well with the main flow. The plume also blocks the main flow and creates a wake behind it. The wake contains hot air and high-energy vortices that can flow into contact with the bypass duct surfaces creating "hot spots" where components can be overheated and consequently damaged.

Further, the blockage created by the plume can affect the performance of the fan disposed upstream. The blockage locally increases the pressure ratio across the fan, reducing its stall margin. Thus, the plume creates an increased likelihood that the fan will stall, a condition in which the flow across the fan breaks down and all thrust from the engine is lost.

According to the present invention there is provided a flow discharge device in a duct, for discharging a secondary fluid flow into a main fluid flow travelling along the duct, the device comprising a discharge outlet disposed to discharge the secondary fluid flow as a plume directed into the duct in a direction transverse to the main fluid flow, the outlet being configured so that the cross-section of the plume adjacent to the outlet is elongate in the direction of the main fluid flow and tapers towards its trailing edge, with respect to the direction of the main fluid flow, and has the shape of an aerofoil.

The cross-section of the plume may have the shape of an aerofoil. Embodiments in accordance with the present invention may thus create a plume which creates a lower disturbance to the main fluid flow than known discharge devices.

The outlet may comprise a single opening. Alternatively, the outlet may comprise an array of openings which together create the plume of the desired cross-section. The shape of the array of openings may have a curved leading edge, which may be arcuate or elliptical. The shape of the array may have convergent side edges extending towards each other from the leading edge. The side edges may meet each other at the trailing edge of the shape of the array.

The porosity of the array may vary over the array. The porosity is governed both by the flow-cross section of individual openings of the array, and by the proximity of adjacent openings to one another. For example, the porosity may be greater at the side edges and the trailing edge of the array than at the leading edge of the array. This may be achieved by an increased flow cross-section of the openings in the side edge regions and the trailing edge region of the array by comparison with those at the leading edge region.

The thickness to chord ratio of the outlet may, in some embodiments in accordance of the present invention, be not greater than 1:2 and not less than 1:4.

The outlet may be provided in an outlet panel which is disposed at a wall of the duct carrying the main fluid flow. A gulley may be provided between the outlet panel and the wall. The outlet panel may have generally the same shape as the outlets. Consequently, where the outlet comprises an array of openings, the openings may be distributed over substantially the entire area of the outlet panel.

Another aspect of the present invention provides a gas turbine engine having a flow discharge device as defined above, the flow discharge device comprising a compressor bleed valve outlet disposed in a duct which is a bypass duct of the engine.

For a better understanding of the present invention, and to show more clearly how it may be carried into effect, reference will now be made, by way of example, to the accompanying drawings, in which.

Figure 3:
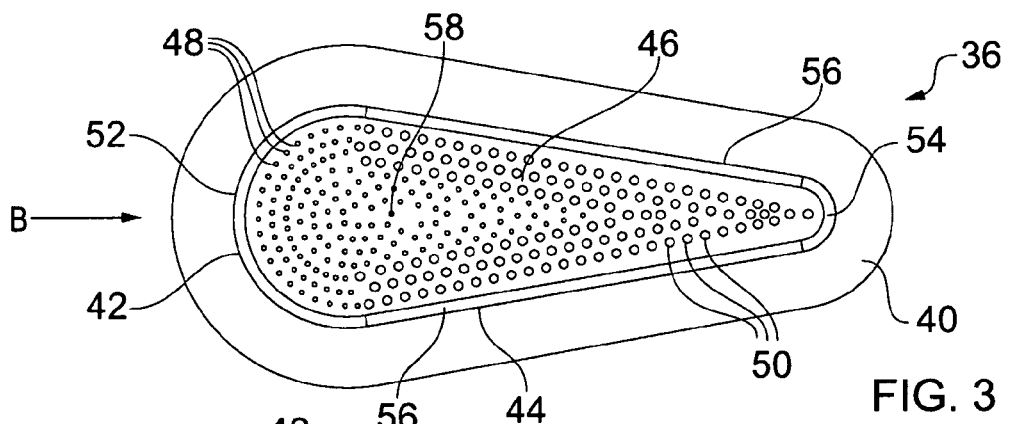
Figure 4:
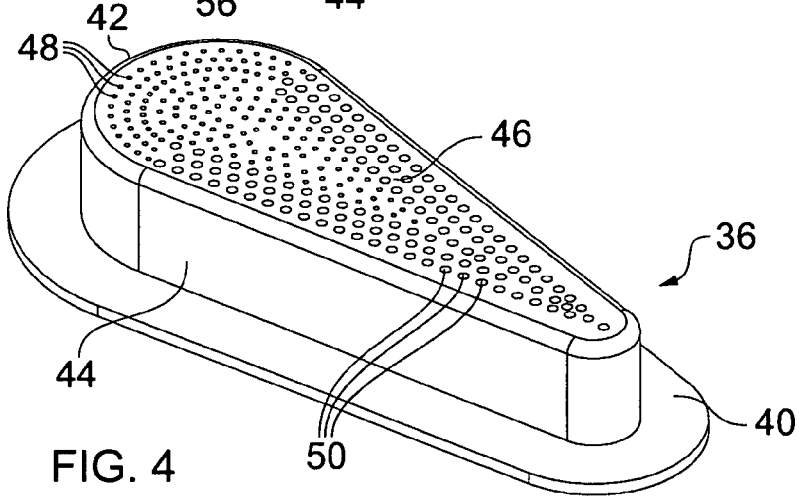
Figure 5:
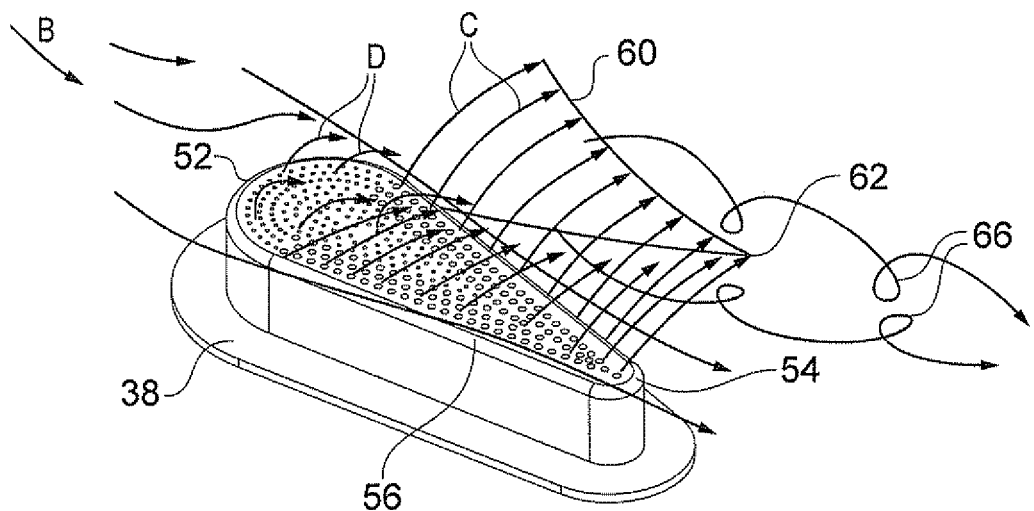
Figure 6:
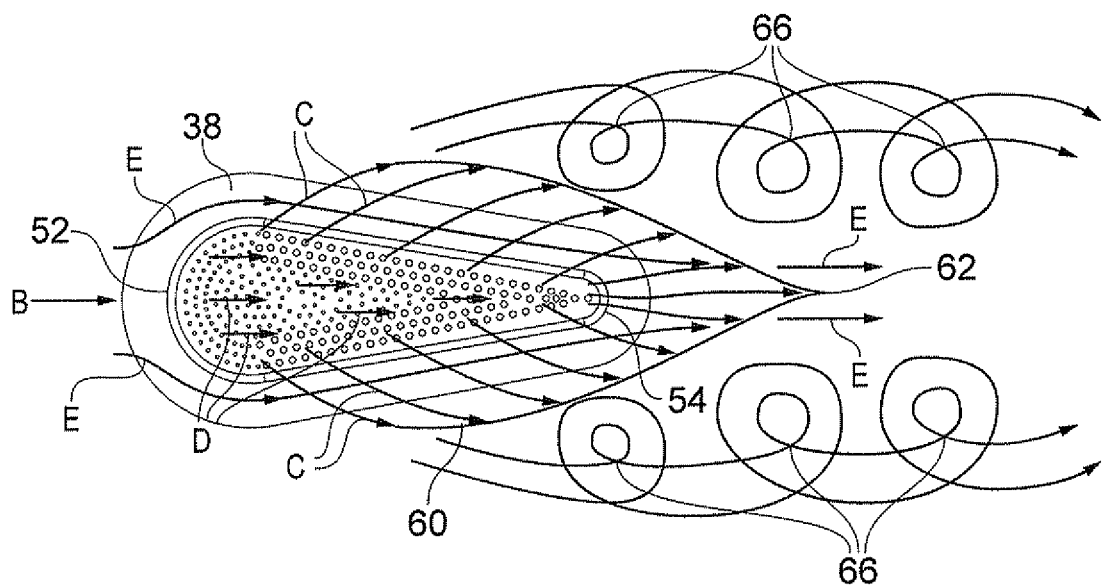

FIGS. 3 and 4 are views of a bleed valve outlet in accordance with the present invention; and FIGS. 5 and 6 represent air flow patterns generated in use of the bleed valve outlets of FIGS. 3 and 4.

Figure 1:
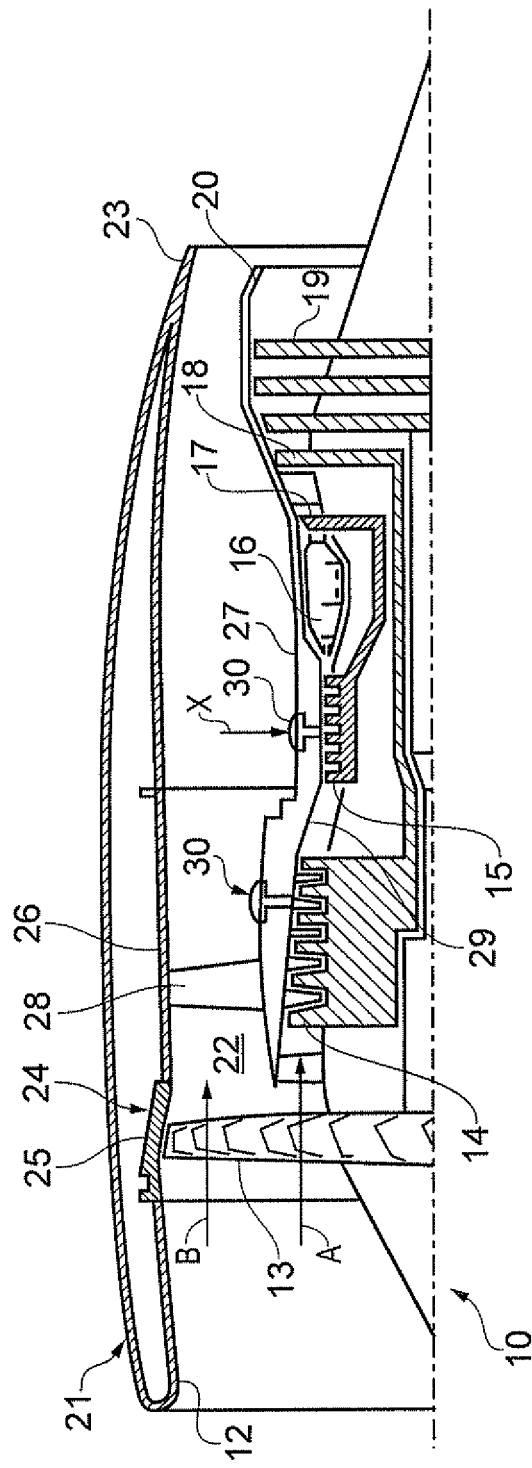
FIG. 1 is a schematic sectional view of a gas turbine engine.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 4 comprises a rigid containment casing 25 and attached inwardly thereto is a rear fan casing 26. The bypass duct 22 is defined between the rear fan casing 26 and an inner wall 27. The inner wall 27 is spaced outwardly from a compressor casing structure 29 which accommodates the intermediate and high pressure compressors 14, 15.

During engine operation and particularly when changing rotational speed at low power it is important to ensure that the pressure ratio across each compressor 14, 15 remains below a critical working point, otherwise the engine 10 can surge and flow through the engine 10 breaks down. This can cause damage to engine's components as well as aircraft handling problems.

To maintain a preferred pressure difference across a compressor 14, 15, or even just one stage of a compressor 14, 15, bleed assemblies 30 are provided to release pressure from an upstream part of a compressor 14, 15. Operation of a bleed assembly 30 and engine operability are described in "The Jet Engine" 6th Edition, 2005, Rolls-Royce plc, pages 79-80, and details of such operation will therefore only be briefly mentioned herein.

The bleed assemblies 30 each open into the bypass duct 22 at a pepper pot 32 (FIG. 2) situated in the inner wall 27. The inner wall 27 is omitted from FIG. 2, so that the compressor casing structure 29 is visible.

Figure 2:
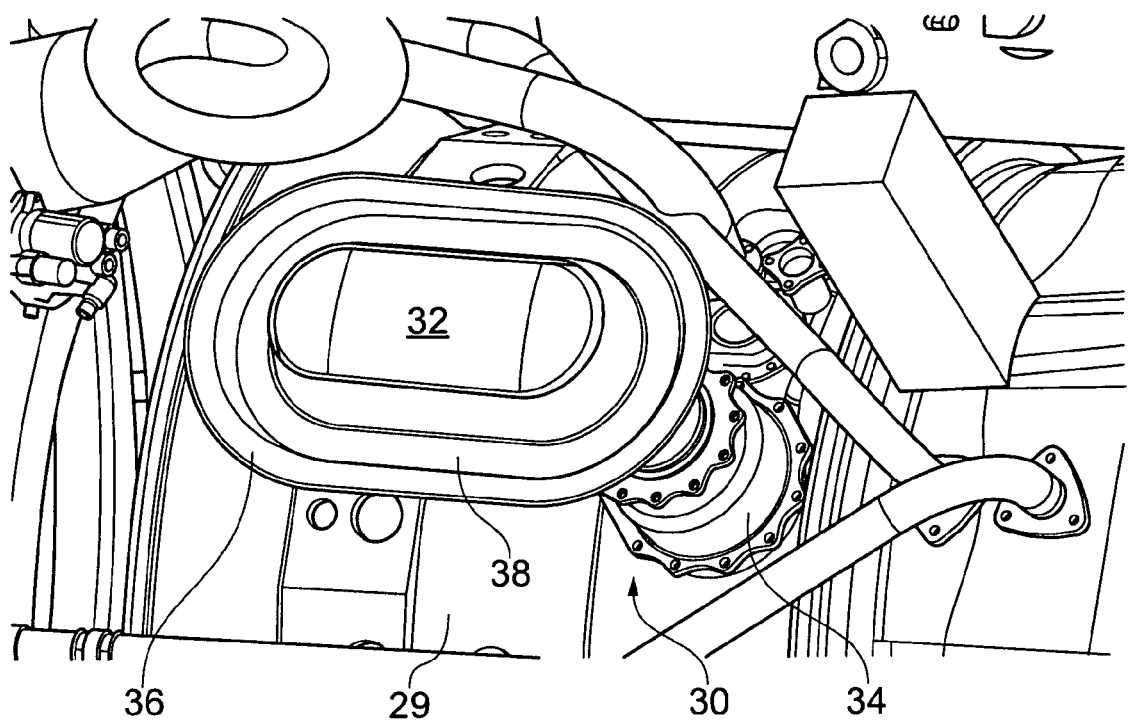
FIG. 2 is a view of a prior art bleed valve outlet of the engine of FIG. 1.

The bleed assembly 30 comprises a bleed valve 34 which communicates at one end with the respective compressor 14, 15 and is provided at its other end with a discharge device 36 including the pepper pot 32. As shown in FIG. 2, the pepper pot 32 is of "race track" form, comprising a semicircle at each end, the semicircles being interconnected by straight lines. The pepper pot 32 is surrounded by a gulley 38 which lies between the pepper pot 32 and the inner wall 27 of the bypass duct 22.

In operation of the engine shown in FIG. 1, parts of the core engine air flow A may be diverted through the bleed assembly 30 by opening the bleed valve 34 so that the bleed air flow passes from the respective compressors 14, 15 to be discharged into the bypass duct 22 through the openings (not shown in FIG. 2) in the pepper pot 32. The jets of air issuing from the holes in the pepper pot form a plume initially directed outwardly, ie transversely of the direction of the air flow B, constituting a main flow, travelling through the bypass duct 22. In this specification, the term "transversely" is not to be understood as indicating that the plume is precisely normal to the main air flow B. Instead, the bleed air issuing from the pepper pot openings may be directed obliquely of the main air flow B. As mentioned above, this plume creates an obstruction to the main air flow B which can have an effect on the performance of the fan 13, and also contains hot gas which can come into contact with components in the bypass duct 22, principally the inner wall 27, potentially causing damage.

FIGS. 3 and 4 show a discharge device 36 in accordance with the present invention, suitable for use as replacement for the discharge device shown in FIG. 2.

The discharge device shown in FIGS. 3 and 4 comprises a hollow cap 42 provided with a flange 40, suitable for securing to the inner wall 27 of the engine. The flange 40 may serve as the base of the gulley 38 when the discharge device 36 is installed.

The hollow cap 42 comprises a sidewall 44 and an outlet panel 46. The outlet panel 46 is perforated by an array of openings 48, 50, which extend over substantially over the full area of the outlet panel 46.

The outlet panel 46 has an aerofoil shape, made up of arcuate leading and trailing edges 52, 54 joined by straight side edges 56. The trailing edge 54 has a smaller diameter than the leading edge 52, with the result that the side edges 56 converge towards each other towards the trailing edge 54. It will be appreciated that, although the shape as described above is the shape of the outlet panel 46, the array of openings 48, 50 covers substantially the entire area of the outlet panel 46, and so has generally the same shape. In the example shown, at the trailing edge 54 the array of openings 48, 50 terminates at what can be regarded as a point represented by a single one of the openings 50. Alternatively, the trailing edge 54 of the array of openings may terminate with a plurality of openings 50.

When installed, the discharge device 36 is oriented within the bypass duct 22 so that the leading edge 52 faces the main air flow B. The openings 48 in the region of the leading edge 52, and in the central region 58 of the array of openings 48, 50, have a smaller flow cross-section than the openings 50 disposed along the straight edges 56 and at the trailing edge 54. The region of the outlet panel 46 along the side edges 56 and the trailing edge 54 may have a greater porosity (i.e. the flow area per unit surface area of the outlet panel 46) than the region at the leading edge 52 and in the centre 58 of the outlet panel 46. The porosity may be varied by varying the size of the openings 48, 50 and by varying the spacing between adjacent ones of the openings 48, 50. In the embodiment shown in FIGS. 3 and 4, the openings 48, 50 are circular holes. In other embodiments, other shapes may be suitable. For example, some or all of the openings 48, 50 could be in the form of slots. Another possibility is for at least some of the openings, for example the openings 48 towards the leading edge 42 of the array, could be replaced by a louvered section of the outlet panel 46. In another embodiment, the array of openings 48, 50 could be replaced by a single outlet opening of an appropriate shape, for example of aerofoil shape similar to the shape of the array of openings 48, 50.

FIGS. 5 and 6 illustrate the discharge device 36 of FIGS. 3 and 4 during operation of the engine shown in FIG. 1. Hot bleed air, constituting a secondary flow of air, is discharged through the openings 48, 50 to form a plume 60. As can be appreciated from FIG. 6, the plume 60 has a tapering, generally aerofoil shape, terminating at a sharp trailing edge 62. As shown in FIG. 5, air issuing from the relatively large openings 50 along the side edges 56 forms a curtain, as indicated by arrows C, which extends transversely into the main air flow B. The smaller diameter openings 48 towards the leading edge 52 of the outlet panel 46 provide a lower energy discharge of air, represented by arrows D. This air flow D mixes readily with the main air flow B. The mixed flow then trips over the curtain (arrows C) to generate strong counter rotating geared vortices 66. By "geared vortices" is meant vortices which do not conflict with one another on opposite sides of the flow, since they rotate in opposite directions like engaged gears.

These vortices 66 persist along the length of the bypass duct, following the duct stream lines. As a result of the flow patterns discussed above, the plume 60 of hot air is held away from the walls 26, 27 of the bypass duct 22. This effect is enhanced by air from the main bypass flow B which is entrained by the outer flanks of the plume 60 and forced outwards (away from the inner wall 27) and into the region downstream of the discharge device 36. This action pushes the flow containing the vortices 66 away from the inner wall 27.

As mentioned above, a gulley 38 (FIGS. 2 and 5) extends around the cap 44. This gulley accommodates a bleed valve fire seal and allows relative movement between the discharge device 36 and the surrounding inner wall 27. The main flow B fills the gulley and, as indicated by arrows E, this air flows around the cap 44 on each side and spills out of the gulley 38 at the trailing edge. This relatively cool bypass air thus flows along the inner wall 27 shielding the inner wall from the higher temperature flow, including the plume 60 and the vortex flow 66, so avoiding the creation of hot spots at the inner wall 27. The tapering configuration of the cap 44 causes the air flow E to be focussed at the region directly downstream of the discharge device 36 so maximising the cooling effect.

The configuration of the plume 60, resulting from the configuration of the array of holes 48, 50, reduces the wake formed by the plume 60 downstream of the discharge device 36. The plume 60 thus acts in a manner similar to an aerofoil, so that the main flow B flows smoothly around the plume 60, and comes together downstream of the plume. The channeling of the main flow B around the gulley 38 creates a shielding airflow downstream of the discharge device 36, preventing the hot gas plume 60 from contacting the inner wall 27. Also, because the plume 60 entrains the main flow B to be swept away from the inner wall 27, some of the cooler main flow B provides further shielding of the plume.

The aerofoil shape of the plume 60 presents a smaller obstruction to the main flow B than known discharge devices, and consequently the blockage effect is reduced, so reducing the effect on fan performance, and increasing the stall margin.

Although the invention has been described with reference to a bleed assembly in a gas turbine engine, a discharge device as described above can also be used in other applications where a high-pressure flow of fluid is to be discharged into a main flow in a manner which holds the discharge flow away from the main flow duct wall. For example, similar discharge devices may be used in gas turbine engines for components such as drain masts and fire zone exits.

The invention claimed is:

1. A flow discharge device in a duct comprising a compressor bleed air into a bypass duct discharge device, for discharging a secondary fluid flow into a main fluid flow travelling along the duct, the device having a shape of an aerofoil comprising:
    a discharge outlet comprising an array of openings disposed to discharge the secondary fluid flow as a plume directed into the duct in a direction transverse to the main fluid flow, the array of openings comprising a plurality of first openings adjacent to a leading edge of the aerofoil-shaped flow discharge device and a plurality of second openings adjacent to convergent side edges forming a V-shape, the plurality of first openings having a smaller diameter than the plurality of second openings, and
    the discharge outlet being configured so that a cross-section of the plume adjacent the discharge outlet is elongate in a direction of the main fluid flow so as to reduce an obstruction to the main fluid flow and tapers towards its trailing end, with respect to the direction of the main fluid flow.

2. A flow discharge device as claimed in claim 1, in which the array of openings has a shape comprising a curved leading edge, with respect to the direction of the main fluid flow.

3. A flow discharge device as claimed in claim 2, in which the curved leading edge is arcuate.

4. A flow discharge device as claimed in claim 1, in which the convergent side edges of the array of openings meet at a trailing edge of the array of openings, with respect to the direction of the main fluid flow.

5. A flow discharge device as claimed in claim 2, in which the array of openings each has a larger flow cross section at the convergent side edges and a trailing edge of the array of openings than at the curved leading edge of the array of openings.

6. A flow discharge device as claimed in claim 2, in which the array of openings has a porosity that varies.

7. A flow discharge device as claimed in claim 6, in which the porosity of the array of openings is greater at the convergent side edges and the trailing edge of the array of openings than at the curved leading edge of the array of openings.

8. A flow discharge device as claimed in claim 1, in which the discharge outlet has a thickness/chord ratio of not greater than 1:2 and not less than 1:4.

9. A flow discharge device as claimed in claim 1, in which the discharge outlet is provided in an outlet panel disposed at a wall of the duct.

10. A flow discharge device as claimed in claim 9, in which a gulley is disposed between the outlet panel and the wall of the duct.

11. A flow discharge device as claimed in claim 8, in which the outlet panel has generally the same shape as the discharge outlet.

12. A gas turbine engine provided with a flow discharge device in accordance with claim 1, the duct being a bypass duct of the gas turbine engine, and the flow discharge device comprising a compressor bleed valve outlet.

13. A flow discharge device in accordance with claim 1, wherein the plume comprises a sum of the secondary fluid discharged from the array of openings.

14. A gas turbine engine provided with a flow discharge device in accordance in claim 1, wherein the plume comprises a sum of the secondary fluid discharged from the array of openings.

* * * * *